May 5, 1970 A. W. MASSMAN 3,510,574

COLOR TELEVISION SIGNAL DEMODULATION SYSTEM

Filed Sept. 11 1967

INVENTOR
ALBERT W. MASSMAN

BY Mueller, Aichele & Rauner

ATTYS.

3,510,574

COLOR TELEVISION SIGNAL DEMODULATION SYSTEM

Albert W. Massman, Wheaton, Ill., assignor to Motorola, Inc., Franklin Park, Ill., a corporation of Illinois Filed Sept. 11, 1967, Ser. No. 666,749
Int. Cl. H04n 9/50
U.S. Cl. 178—5.4 6 Claims

ABSTRACT OF THE DISCLOSURE

A direct color television signal demodulator includes synchronous detectors to provide color representative video signals, each demodulator having two branches fed by the same phase brightness signal and opposite phases of modulated color subcarrier signal. A series impedance in each branch and a shunt impedance between the two branches establishes the brightness signal to color subcarrier ratio to compensate for the transmitted amplitudes of color difference signals in a received composite signal.

INTRODUCTION

Figures 1, 2:
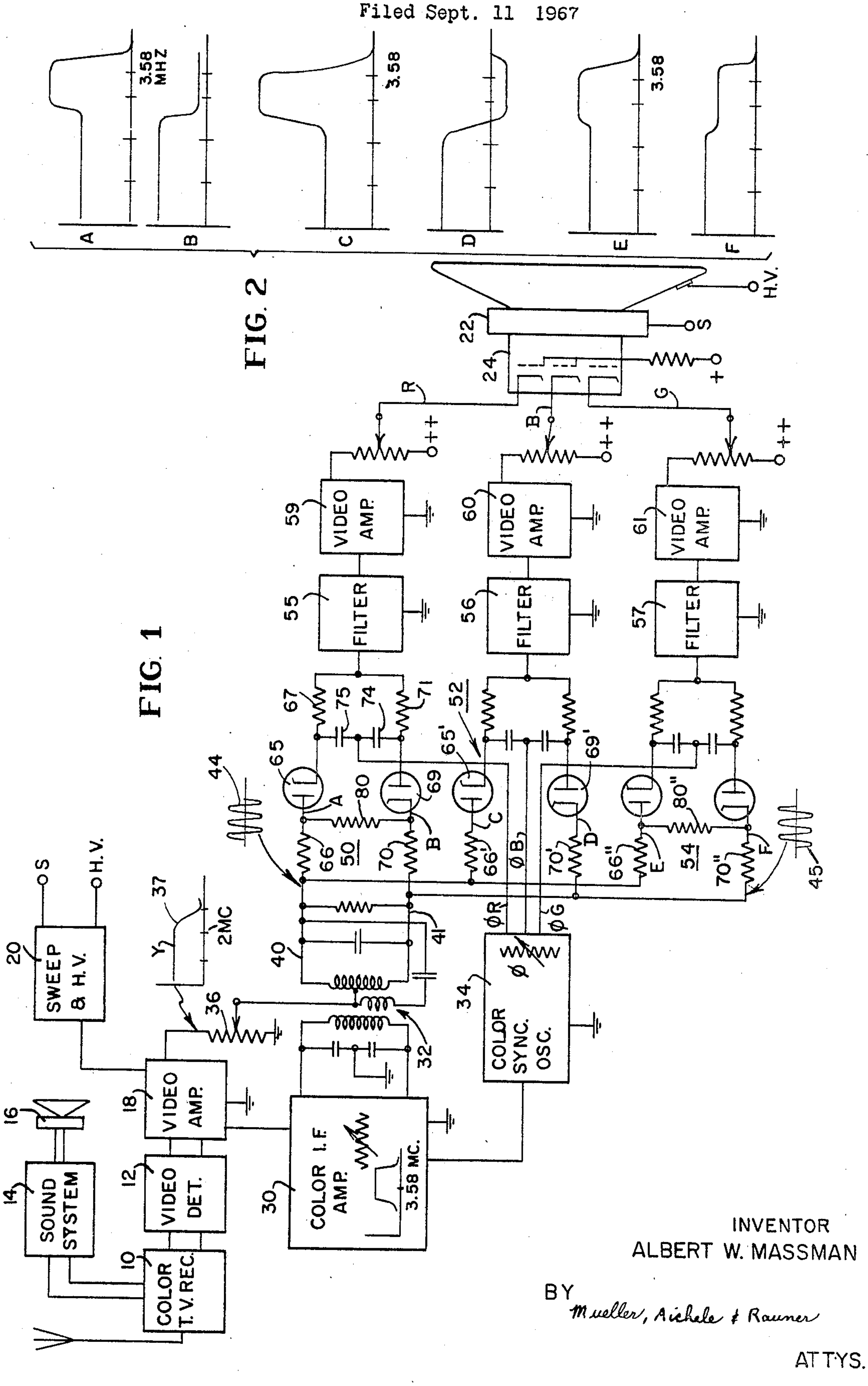

The NTSC color television signal presently in use includes a wideband brightness or luminance (Y) signal and a modulated subcarrier signal of approximately 3.58 mHz. The subcarrier signal is phase and amplitude modulated by color difference signals ($R-Y$, $B-Y$, and $G-Y$), so that phases of the subcarrier each represent the hue of an image portion and the subcarrier amplitude at that phase represents the saturation of that hue. A monochrome receiver visibly reproduces only the Y component.

The ususal color receiver includes a demodulator for synchronously recovering the color difference signals which can be added to the Y signal for developing red, blue and green representative signals to be reproduced by the cathode ray tube. In the system herein described the luminance signal and the modulated chroma subcarrier are applied to separate demodulators each fed by a properly phased reference signal of subcarrier frequency for directly producing red, blue and green representative video signals, thereby avoiding separate recovery and combination of the brightness signal with the demodulated color difference signals.

The NTSC standards for a color television signal provide that the combined chrominance modulation with the luminance signal not overdrive a monochrome receiver into the blacker than black and whiter than white regions of its picture tube operation by more than 33% when a signal of maximum color saturation is being transmitted. Avoiding overdrive of the picture tube under practical conditions is desirable to prevent rectification of the color signal by the picture tube and reduction of the visual cancellation of the chrominance signal which occurs through selection of the chroma subcarrier to be at an odd multiple of one half the line deflection frequency.

The NTSC chrominance signal has the following form:

$$E_m = E_Y + 1.14\ (E_R - E_Y)\ \cos \omega t + 1/2.03(E_B - E_y)\ \sin \omega t$$

(for double sideband color information up to approximately 500 KHz). Furthermore, the luminance signal, in order to be compatible for use in a monochrome receiver and to produce shades of gray closely approximating the brightness which the human eye would see, has the following form:

$$E_y = .30\ E_r + .11\ E_B + .59 E_G$$

Recently different phosphors have been incorporated in some image reproducers and an adjustment is necessary in demodulating a received signal in order to extract the proper information from the signal to properly drive such tubes in a given receiver. A full explanation of this is presented in the paper entitled "An Analysis of the Necessary Decoder Corrections for Color Receiver Operation with Non-Standard Receiver Primaries" by N. W. Parker, in the IEEE Transactions on Broadcasted Television Receivers, April 1966, page 23.

When signals of the above type are applied to a direct demodulator, the ratio of luminance to chrominance applied to each demodulator must be established so that it can operate on both color difference (saturation) information and brightness information to produce a color representative signal without an unbalance of one portion or the other. In the past step filters have been tried to accomplish this for certain kinds of demodulators, but these are expensive and difficult to construct for proper operation.

An object of this invention is to simplify and reduce the cost of a signal proportioning circuit for a direct color signal demodulator.

Another object is to apply full level brightness signals and a selected amplitude of opposite phases of a color modulated subcarrier to a direct demodulator for producing a color representative signal.

In this demodulation system individual demodulator sections directly produce red, blue and green representative video signals. These demodulators are each controlled by a color reference signal having a phase associated with one of these colors. Two switch devices in each demodulator section are alternately rendered conductive. The switch devices are fed the brightness signal through parallel paths, each having a series resistor. Opposite phases of the chroma modulated subcarrier signal are respectively fed through each series resistor also. A shunt resistor across the two paths, together with the series resistors, provides selected amplitudes of chroma subcarrier with respect to brightness signal level. Corresponding networks are used with each demodulator section to compensate for the different levels of color difference signals represented in the subcarrier in the compatible NTSC signal demodulated by the system.

Detailed description

In the drawing:

FIG. 1 is a diagram, partly in block and partly in schematic form, illustrating a color television receiver incorporating the invention; and FIGS. 2A–F are frequency response curves representing operation of different portions of FIG. 1.

In FIG. 1 the color television receiver 10 is coupled to a suitable antenna to receive a signal and to select amplify and convert it to IF frequency for application to the video detector 12. The receiver circuitry 10 is also coupled to a sound system 14 which demodulates and amplifies the usual 4.5 mHz, sound subcarrier to be reproduced by speaker 16 as audio.

Video detector 12 is coupled to a video amplifier 18 having outputs to the various remaining stages of the receiver. The horizontal and vertical beam synchronizing pulses of the signal are selected by the sweep and high voltage system 20 which has an output coupled to the deflection yoke 22 on the neck of the tri-beam cathode ray tube 24. The system 20 also provides a high voltage for the screen of the shadow mask picture tube 24. Video amplifier 18 is further coupled to the color subcarrier IF amplifier 30 which includes bandpass filter network for selecting the color subcarrier at 3.58 mHz. and its associated sidebands. Amplifier 30 includes a gain or color intensity control to furnish a selected amplitude of the chroma subcarrier signal of opposite phase with respect to ground at the primary winding of the transformer 32.

The color IF amplifier 30 is further coupled to the color synchronizing oscillator 34 which selects the burst signals appearing on the "back porch" of the horizontal synchronizing pulses in order to develop a color reference signal of 3.58 mHz. for synchronous demodulation. The oscillator 34 also has a control to shift the phases of its three different output signals thereby shifting the demodulation angle slightly and affording a color shift in the reproduced image.

The video amplifier 18 includes a variable contrast control 36 across a selected portion of which the wide band composite signal is developed with respect to ground to be applied to the center tap of the secondary winding of the transformer 32. The luminance signal available at control 36 may extend in frequency range 37 up to or into the chroma subcarrier sidebands.

The secondary winding of transformer 32 has one output lead 40 and a second output lead 41. Both of these leads carry the luminance component with respect to ground. Lead 40 carries the modulated chroma subcarrier 44 of one phase, whereas lead 41 carries the modulated chroma subcarrier 45 of opposite phase. Signals 44 and 45 are oppositely phased with respect to ground and are phase modulated to represent hue and amplitude modulated to represent saturation. The leads 40 and 41 are each coupled to direct color signal demodulators 50, 52 and 54 respectively providing output signals to the associated filters 55, 56 and 57. Filters 55–57 are respectively coupled to video amplifiers 59, 60 and 61, at the output of which the video signals representing red, blue and green are developed. Each amplifier 59–61 includes a variable resistor coupled to a cathode of the tri-beam cathode ray tube 24. These cathodes are part of the so-called red, blue and green electron guns in the picture tube 24. Associated grids of these cathodes are coupled to a suitable bias source and the tube 24 operates in accordance with known shadow mask principles to reproduce a monochrome or full color image in accordance with video drive signals applied to it.

In the receiver generally described so far there may be further circuitry which is known and has not been disclosed in detail in order to simplify the disclosure. For example, there can be a gated automatic gain control system, a color killer system for interrupting the amplifier 30 in the absence of the color signal, as well as other circuitry now known in commercially produced color television receivers. It should further be noted that it is preferable for the video detector 12 to be direct current coupled through all of the succeeding amplifiers and demodulators directly to the cathodes of the picture tube 24 in order to maintain the DC component of the signals processed in the various translation paths.

Turning now to the demodulator system, the direct color signal demodulator 50 includes a first diode 65 coupled in series with resistors 66 and 67 between the input lead 40 and the filter 55. The second diode 69 is series coupled with resistors 70 and 71 between the input lead 41 and the filter 55. A signal of subcarrier frequency and proper phase is applied from the reference oscillator 34 to the junction of the capacitors 74 and 75 which are respectively coupled to the diodes 69 and 65.

It will be noted that the diodes 65 and 69 are oppositely polarized and the color reference signal is applied in the same phase to different electrodes of the two diodes. Furthermore, the input to the diodes comprises opposite phases of the modulated color subcarrier and the same phase of the brightness signal. Accordingly, during the one half cycle of the color reference signal from oscillator 34, diode 65 will conduct to translate a portion of the luminance signal and a portion of the proper phase of the associated amplitude of the color subcarrier 44 to produce a signal component representing the red information at the filter 55. During the next half cycle of the color reference signal, diode 69 will similarly conduct, although in this instance on an opposite phase and next half cycle of the modulated subcarrier 45 to also pass a portion of the red representative signal to filter 55. In this way what amounts to full wave demodulation of the color subcarrier 44, 45 takes place, along with translation of the associated portion of the luminance signal. Filter 55, having a DC path to ground, establishes a proper video frequency bandwidth to integrate the signal portions comprising the brightness and saturation components conducted by the diodes 65 and 69.

In direct demodulators of the prior art which have produced a color representative signal of proper amplitude for the brightness, hue and saturation of the image, there has generally been a spurious signal component introduced by the modulation of the luminance signal in band 37 with the color reference signal from the oscillator 34. However, in the system presently described the luminance signal is applied unbalanced to the demodulator switches, whereas opposite phases of the modulated subcarrier is applied so that any spurious modulation component of luminance at the 3.58 mHz. rate from one diode is cancelled in the filter by an opposing spurious component from the other demodulator switch. Any other luminance and reference modulation components are established at twice the frequency of the color reference oscillator so these are filtered out by the filter 55 since the components fall in the band centered around 7.16 megacycles and higher than the 3 mHz. upper limit to filter 55.

The configuration of the demodulators 52 and 54 is similar to that of demodulator 50 just described. The difference among them comes in the apportioning of the modulated color subcarrier to the different demodulators 50, 52 and 54. The series input resistors 66' and 70' for the blue signal demodulator 52 and the resistors 66'' and 70'' for the input to the green signal demodulator 54 may all have the same ohmic value. Furthermore, a shunt resistor 80 is connected between the resistors 66 and 70 where these resistors are respectively connected to the diodes 65 and 69. A resistor 80'' is connected between the resistors 66'' and 70'' where these resistors are respectively connected to their associated demodulator diodes. There is no corresponding resistor element connected between the input paths in the demodulator 52 so the impedance between the resistors 66' and 70' is very high and at a maximum. Since there is no shunt resistor in the input to demodulator 52 the maximum level of opposite phase color modulation components is applied to the diodes 65' and 69'. This condition is represented in curves C and D of FIG. 2 which show the frequency response at the diodes. There is a maximum peaking of the color subcarrier at one diode with respect to the level of luminance passband, whereas the other diode has a maximum reverse phase of chroma subcarrier.

The resistor 80'' is small compared to resistor 80, and, of course, small compared to the extremely high shunt resistance and in demodulator 52, so that the opposite phase subcarrier signals applied to the ends of resistor 80'' very nearly balance to the level 37 of the Y signal. The bandpass characteristic is represented by curves E and F of FIG. 2.

Resistor 80 is larger than resistor 80'' and smaller than the high resistance at the input to demodulator 52 so that an intermediate level of color subcarrier is applied to the diode switches 65 and 69 in demodulator 50. These responses are represented as curves A and B of FIG. 2. In a circuit of practical construction resistors 66, 70, 66', 70', 66'' and 70'' each had a value of 270 ohms and resistor 80 had a value of 2700 ohms, whereas resistor 80'' had a value of 150 ohms. As indicated previously, the values are selected in accordance with the NTSC standard signal and the particular phosphors being used in tube 24, all as discussed in the above identified Parker paper. The ratios of chroma and luminance signals are proportional to 1/1.14, 1/2.03 and 1/.642 for red, blue and green signals but the absolute signal level is set by the intensity control in amplifier 30 for demodulation action and circuit efficiency.

Accordingly, it may be seen that by means of relatively simple resistive dividers the bandpass characteristic of the color IF amplifier 30 is applied to the three demodulators 50, 52 and 54 with an adjustment in amplitude taking place in each demodulator with respect to the common luminance signal applied to them so that the luminance to color subcarrier ratio is adjusted at each demodulator to compensate for differences in color difference signals as transmitted.

What is claimed is:

1. In a color television receiver for a signal comprising brightness signal components of a television image and a subcarrier signal modulated by color difference signals representing hue and saturation of the image at different phases of the subcarrier, the combination of, a demodulator including a pair of switching devices coupled to an output circuit, means for rendering said switching devices alternately conductive at the subcarrier frequency to provide a signal representing one color, a first path applying the modulated subcarrier signal of one phase to one of said switching devices, a second path applying the modulated subcarrier signal of opposite phase to the other of said switching devices, means applying the brightness signal components to said first and second paths, and a shunt resistance connected between said first and second paths to form a subcarrier signal divider therewith for establishing the amplitude of the modulated subcarrier signal at each of said switching devices with respect to the level of the brightness signal components to develop at said output circuit a video signal representing brightness and saturation of a portion of the image of one hue.

2. The combination of claim 1 including a further pair of switching devices alternately conductive to provide a signal representing a different color, third and fourth paths respectively applying the subcarrier signal of opposite phases individually to said further switching devices and the brightness signal components to both of said further switching devices, and an additional shunt resistance connected between said third and fourth resistive paths for establishing a different ratio of subcarrier signal to brightness signal components at said further pair of switching devices than is established at the first mentioned pair of switching devices.

3. The combination of claim 1 including a further pair of switching devices alternately conductive to provide a signal representing a second color, third and fourth resistive paths respectively applying the subcarrier signal of opposite phases individually to said further switching devices and the brightness signal components to both of said further switching devices, said third and fourth resistive paths establishing a different ratio of subcarrier signal to brightness signal components at said further pair of switching devices than is established at the first mentioned pair of switching devices.

4. The combination of claim 2 in which said first, second, third and fourth paths each have the same value of impedance.

5. In a color television receiver for a signal comprising brightness signal components of a television image and a subcarrier signal modulated by color difference signals representing hue and saturation of the image at different phases of the subcarrier, the ratio of subcarrier signal with respect to brightness signal components being different for image portions of different hue, the combination of, a first signal supply circuit providing the subcarrier signal at one phase and the brightness signal components with respect to a reference point, a second signal supply circuit providing the subcarrier signal at opposite phase and the brightness signal components with respect to a reference point, a voltage divider coupled between said first and second signal supply circuits, a synchronous demodulator coupled to two different points of said voltage divider and to the reference point, said synchronous demodulator being operative at one phase of the subcarrier signal, said voltage divider proportioning the subcarrier signals with respect to the brightness signal components to develop a signal representative of brightness and saturation of a portion of the image of one hue.

6. The combination of claim 5 in which said first and second signal supply circuits are coupled to a band pass amplifier for selecting the subcarrier signal and to a low pass amplifier for selecting the brightness signal components.

References Cited

UNITED STATES PATENTS

| | | |
|---|---|---|
| 3,405,229 | 10/1968 | Parker. |
| 3,405,231 | 10/1968 | Hilbert et al. |

ROBERT L. GRIFFIN, Primary Examiner

R. MURRAY, Assistant Examiner